March 1, 1932. W. C. UHRI, JR 1,847,281
STUFFING BOX FOR VALVES OR THE LIKE
Filed May 4, 1929
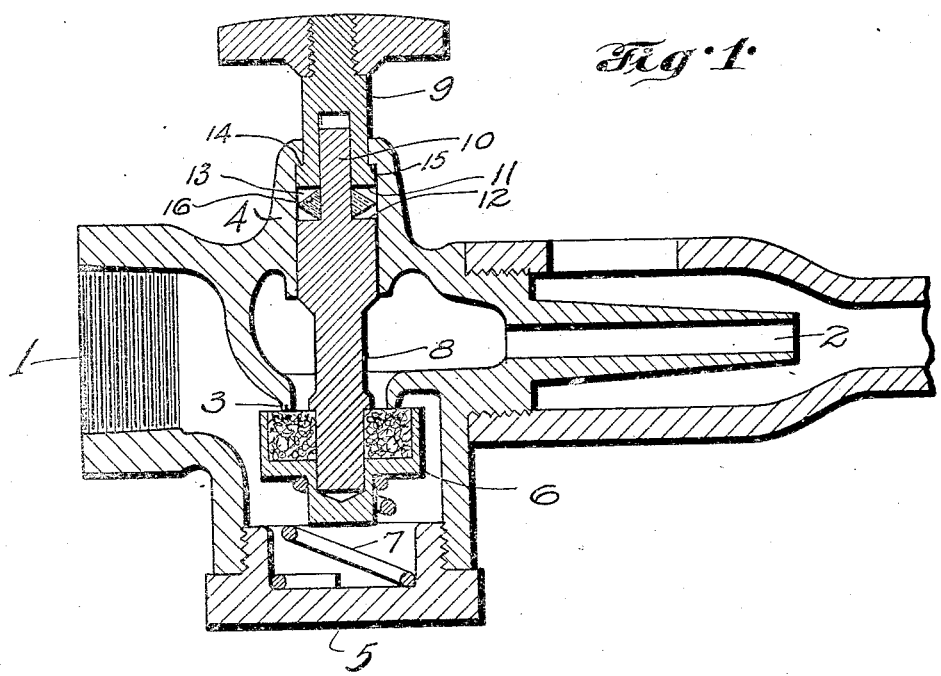
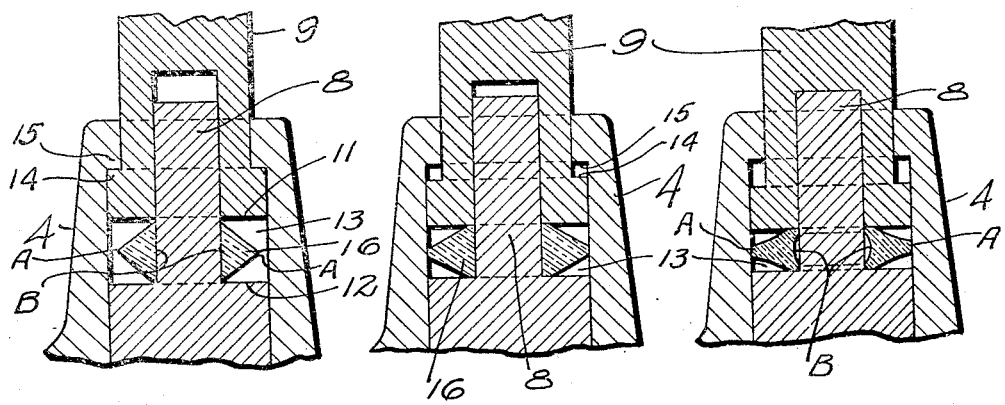
Inventor
William C. Uhri, Jr.
By Rodney Bedell
Attorney Patented Mar. 1, 1932                                                      1,847,281

UNITED STATES PATENT OFFICE

WILLIAM C. UHRI, JR., OF CLAYTON, MISSOURI, ASSIGNOR, BY MESNE ASSIGNMENTS, TO CENTRAL ENGINEERING & SALES COMPANY, OF ST. LOUIS, MISSOURI, A CORPORATION OF MISSOURI

STUFFING BOX FOR VALVES OR THE LIKE

Application filed May 4, 1929. Serial No. 360,589.

My invention relates to a valve stuffing box and comprises a novel two part plunger and compressible packing associated therewith and a casing surrounding the plunger and packing, and also includes associated valve structure.

The main object of my invention is to provide a two part sliding stem or plunger by which pressure may be transmitted from a handle part of the plunger to a valve disc part of the plunger, and when pressure is so transmitted, packing between the parts will be compressed but will not be subjected to the entire pressure which may be necessary to move the valve disc.

Another object of my invention is to provide a packing element particularly adapted for use with the plunger and associated parts.

These and other detailed objects of my invention are attained by the structure illustrated in the accompanying drawings and description below.

In the accompanying drawings—

Figure 1 is a vertical, longitudinal section through a nozzle used for controlling the discharge of air in drying apparatus, and embodies my novel valve and stuffing box structure.

Figures 2, 3 and 4 are details drawn on an enlarged scale, showing the parts of the valve plunger and associated parts in different relative positions; Figure 2 illustrating the parts when the valve is closed; Figure 3 illustrating the parts during the initial or sealing movement of the valve handle and Figure 4 showing the secondary or valve stem moving position of the plunger.

The valve body includes an inlet 1, a discharge orifice 2, a valve seat 3, a plunger casing 4 and a removable bottom cap 5. The valve disc 6, of any approved composition, is normally seated against its seat 3 by means of the coil spring 7.

When cap 5 is unscrewed, the movable parts of the valve may be removed through the opening in the lower wall of the casing and this construction also facilitates the machining of the interior of the casing body.

The valve disc is manipulated by means of a two part plunger comprising a valve stem 8 and a stem extension or handle member 9. Stem 8 has a projecting pin 10 of restricted diameter and handle portion 9 has a hollow lower portion slidably receiving the pin 10 of the stem 8.

The lower end 11 of member 9 and the shoulder 12 on stem 8 form opposing surfaces which provide a peripheral groove 13 about pin 10. The length of pin 10 is greater than the depth of the recess in member 9 whereby the approach of surfaces 11 and 12 towards each other is positively limited by engagement of the upper end of the pin 10 and the inner end of the recess in member 9.

A shoulder 14 on member 9 and a lip 15 on casing 4 cooperate to limit the upward movement of member 9.

A packing 16 of compressible material surrounds pin 10 in the peripheral groove provided between surfaces 11 and 12 and preferably washer 16 is of triangular cross section with its base B adjacent to pin 10 and extending between surfaces 11 and 12 and with its apex A adjacent to the casing 4 although the taper of the section may be reversed.

When the parts are in the normal position indicated in Figure 1, packing 16 is merely supporting member 9 and is under practically no pressure and hence its elasticity is not destroyed by prolonged stress. When handle 9 is depressed, it compresses packing 16 so as to distort the latter by expanding it transversely, forcing its base and apex into contact with the pin 10 and casing 4 respectively, and also providing tight contact between the opposite edges of the base and surfaces 11 and 12. The packing, if shaped as shown, takes the form indicated in Figure 4 in which the base will assume a concave form, thereby providing a line contact between its edges and the stem and casing and forming a more effective seal than if the entire area of the base were contacting with pin 10 as is the usual manner of distortion of ordinary washers under similar applications.

As the packing assumes the position shown in Figure 4, the members 8 and 9 positively engage each other through pin 10 and the inner end of the recess in member 9 and further movement of the handle positively moves stem 8 to open the valve without providing increased compression on packing 16.

With this structure, friction between the casing and the packing is limited to the degree required to effect a seal, and is not unduly increased as the valve is opened, hence repeated operations of the valve handle by the fingers of the user is not attended by a muscular strain which would otherwise result.

Another advantage of this structure is that the packing does not have its elasticity or "life" destroyed by excessive compression such as it would have to undergo if the pressure necessary to move stem 8 and disc 6 had to be transmitted through the packing rather than through the solid metal parts of the plunger. As previously noted, the packing is under no pressure when the valve handle is not being manipulated.

Obviously the triangular shape of the packing need not be present in the broadest form of my invention and this and other details of the construction may vary considerably where other stuffing box uses are intended rather than the comparatively simple valve structure illustrated. I contemplate the exclusive use of all modifications of my invention which come within the scope of my claims.

I claim:

1. A stuffing box structure comprising two parts having a telescoping pin and recessed portion respectively, a casing surrounding said parts, opposing surfaces on said parts forming a groove about said pin, and a packing element in said groove adapted to be compressed by said surfaces, as said parts move toward each other, and distorted into contact with said casing, and means limiting movement of said parts towards each other.

2. A stuffing box structure comprising two parts having a telescoping pin and recessed portion respectively, a casing surrounding said parts, opposing surfaces on said parts forming a groove about said pin, and a packing element in said groove adapted to be compressed by said surfaces, as said parts move toward each other, and distorted into contact with said casing, and means positively limiting movement of said parts towards each other before said element is fully compressed.

3. A stuffing box structure comprising two parts having a telescoping pin and recessed portion respectively, a casing surrounding said parts, opposing surfaces on said parts forming a groove about said pin, and a packing element in said groove adapted to be compressed by said surfaces, comprising a ring of compressible material of triangular cross section with its base adjacent and surrounding said pin and extending between said surfaces and with its apex adjacent to said casing, and means limiting movement of said surfaces towards each other after said element has been partially compressed.

4. A stuffing box structure comprising a casing, a stem member and a stem extension member, said members providing spaced elements fitting in said casing and movable longitudinally relatively to each other, a compressible packing member between said elements, and means positively limiting compressing movement of said elements towards each other.

5. A stuffing box structure comprising a casing, a stem member and a stem extension member, said members providing spaced elements fitting in said casing and movable longitudinally relatively to each other, one of said elements including a projecting pin sliding within the other element, a packing member surrounding said pin and normally having no pressure contact with said casing but compressible between said elements to be forced into pressure contact with said casing, and means limiting the movement of said elements towards each other.

6. A stuffing box structure comprising a casing, a stem member and a stem extension member, said members providing spaced elements fitting in said casing and movable longitudinally relatively to each other, one of said elements having a shoulder and a pin projecting therefrom and slidably received in a recess in the other of said elements, a packing ring on said shoulder and surrounding said pin and adapted to be pressed into contact with said stem and said casing by movement of said shoulder and the opposing end of the other element towards each other, the outer end of said pin being spaced from the inner end of said recess a distance less than the distance between said shoulder and the opposing end of the other element.

7. In a valve, a valve seat, a valve disc, a stem on said disc with a projecting pin, there being a shoulder on said stem at the base of said pin, a chamber into which said stem slidingly fits, a valve handle including a hollow lower portion slidably engaging said pin, and an outwardly tapering washer of compressible material between the shoulder and the bottom face of the hollow portion of said handle and surrounding said pin.

8. In a valve, a valve disc, a plunger, a valve seat, a chamber into which said plunger slidably fits, means for limiting the upward movement of said plunger, said plunger including a valve stem and a pin projecting from said stem and forming a shoulder therewith, and a handle member for manually operating said stem, a portion of said handle member being hollow and slidably engaging said projecting pin, a washer resting on said shoulder, and means for limiting the compression of said washer by said handle member when said disc is moved from said valve seat.

9. In a valve, a plunger including relatively movable upper and lower parts, a valve disc on said lower part, a valve seat, a chamber including a passage element into which said plunger slidably fits, means limiting the outward movement of said upper part, said lower part consisting of a valve stem and a pin element projecting from said stem and of less diameter than said stem and forming a shoulder therewith, and a compressible washer of tapering cross section resting on said shoulder, said washer, when under compression, hermetically sealing the space between said pin element and said passage element by a two line contact on one of said elements and a single line contact on the other of said elements.

10. In a valve, a plunger including relatively movable upper and lower parts, a valve disc on said lower part, a valve seat, a chamber including a passage element slidably receiving said plunger, means limiting the outward movement of said upper part, said upper part consisting of a handle and a hollow lower portion and said lower part consisting of a valve stem and a pin element forming a shoulder with said stem and projecting into the hollow portion of said upper part, an element in said hollow portion for limiting the movement of said pin into said hollow portion, and a compressible washer of tapering cross section resting on said shoulder, said washer, when under pressure, hermetically sealing the space between said pin element and said passage element by a two line contact on one of said elements and a single line contact on the other of said elements.

11. In a valve, a plunger including upper and lower parts, a valve disc, a valve seat, a chamber slidably receiving said plunger, the wall of said chamber having an inwardly projecting lip, the upper part of said plunger consisting of a handle and a partially hollow lower portion having an outward projection for contacting with said lip to limit the upward movement of said upper part, and the lower part thereof consisting of a valve stem having a shoulder and a pin projecting from said shoulder and slidably received within the hollow portion of said upper part, and an outwardly tapering washer of resilient material surrounding said pin between said shoulder and said upper part, said washer when not under pressure, being spaced from the wall of said chamber, and said washer, when under pressure, being forced against said wall and said pin, the inner edge of said washer, when under pressure, forming spaced line contacts with said pin, the compression of said washer being limited by the engagement of the upper and lower members of the plunger at such time as said washer has hermetically sealed the space between said pin and said chamber wall, and said disc being arranged to disengage said valve seat when sealing pressure is applied to said plunger and to automatically engage the valve seat when pressure is removed from said plunger.

In testimony whereof I hereunto affix my signature this 21st day of April, 1929.

WILLIAM C. UHRI, JR.